Patented Feb. 4, 1936

2,029,619

UNITED STATES PATENT OFFICE 2,029,619

PURIFICATION OF OXIDATION PRODUCTS

Joseph Hidy James, Pittsburgh, Pa., assignor to Clarence P. Byrnes, trustee

No Drawing. Application July 15, 1933, Serial No. 680,668

7 Claims. (Cl. 87—9)

In various granted patents including reissue Patent No. 18,522, granted July 12, 1932, and pending applications including application Ser. No. 435,355, filed January 6, 1921, I have described my partial oxidation process with either one pass or several passes through heated reaction zones in the presence of oxygen, producing oxygen derivatives of hydrocarbons in the range from alcohols to oxygenated fatty acids, including aldehydes, esters, ethers and various other compounds. Among these products are bodies suitable for lubricants, being substitutes for blends of fatty oils or fatty acids with hydrocarbon oils. For some purposes, the oily partial oxidation product may be used by simply distilling off the lightest portions; the presence of which would lower the viscosity of the lubricant.

The present application relates to purifying the product, particularly for the production of stable lubricants or stable lubricant addition substances, and is especially designed to withstand the severe conditions of internal combustion engines.

In the oily product, there are certain reactive compounds formed which, under the high temperature conditions in internal combustion engines, form gummy or resinous substances.

I have discovered that if the oxidized oil or a portion thereof remaining after distilling off the most volatile portions be treated at a relatively high temperature with a small percentage of concentrated sulphuric acid, I can obtain substantially complete removal of the gum-forming compounds, with no harmful effects on the remaining components of the oily product.

As a rule, this treatment does not leave appreciable quantities of sulphonates (oil-soluble sulphonates) in the oil. The sulphuric acid treatment is preferably followed by several washes with saturated sodium sulphate solution to remove the excess of free sulphuric acid. The oil is then preferably neutralized with sodium hydroxide solution. If it is desired to remove the oil-soluble sulphonates (soaps), the oil may then be washed with a 50—50 alcohol water mixture until these sulphonates are removed.

The lubricant oil is now ready for use and has the character of a hydrocarbon fatty oil or a hydrocarbon-fatty acid blend, because of the presence of oxygenated bodies.

I may apply this procedure to any petroleum fraction, even to the heaviest lubricating oils that can be vaporized for passing through the oxidation process. I have even successfully applied it to partially oxidized petrolatum which is at present produced in large quantities as a byproduct in the lubricating oil industry. I propose to add the oil prepared as above to ordinary mineral lubricating oil to increase its "oiliness", or for more difficult service, the prepared oil itself may be used.

One application consists in the addition of my prepared product of proper viscosity to automobile engine oil. Another closely related use is the application of an oil thus prepared of low viscosity to gasoline as an overhead valve lubricant. The taking out of the gum-forming material by the above process results in a volume shrinkage of about 10 to 20%. The following example will illustrate the preparation of the lubricant:

Example A

A sample of light lubricating oil was used as the raw material. It had the following characteristics:

The specific gravity at 60° F. was .854.
The Engler distillation of the oil was as follows:

| | |
|---|---|
| Initial | 352° C. |
| 5% | 360° C. |
| 10% | 363° C. |
| 15% | 364° C. |
| 20% | 367° C. |
| 25% | 370° C. |
| 30% | 371° C. |
| 35% | 373° C. |
| 40% | 375° C. |
| 50% | 380° C. |
| 60% | 384° C. |
| 70% | 390° C. |
| 80% | 397° C. |
| 90% | 410° C. |
| End | 415° C. |

This oil was then oxidized by my triple screen vapor phase catalytic process, such as set forth in my copending application Ser. No. 435,355, using a volume of air about 900 times the liquid volume of raw material and employing temperatures in the catalytic screen varying from about 450° C. to 480° C. The total oxidized oil from the condenser had the following characteristics:

The specific gravity at 60° F. was .883.
The percentage yield by volume was 73%.
The Engler distillation was as follows:

| | |
|---|---|
| Initial | 87° C. |
| 5% | 160° C. |
| 10% | 185° C. |
| 13% | 200° C. |
| 15% | 207° C. |
| 20% | 215° C. |
| 25% | 277° C. |
| 30% | 292° C. |
| 32% | 300° C. |

The portion above 300° C. was taken for sulphuric acid treatment as above described. It may be noted that the portion under 200° C. is suitable for solvent stock and that the portion between 200° C. and 300° C. is usually taken back and reoxidized by my partial oxidation process with fresh hydrocarbon additions. A motor fuel fraction may also be obtained, and it or any fraction purified by my further treatment herein described. The purified motor fuel fraction may also be used for blending with other motor fuels, as set forth, for example, in my Patent No. 1,716,272.

In the sulphuric acid treatment, 500 cc. of the above oxidized oil distilling over 300° C. was treated at 82° C. with 12.5 cc. of 98% sulphuric acid. After cooling, the oil measured 420 cc. This was washed with sodium sulphate solution, as above described, and finally neutralized and the soaps (of the sulphonates) extracted by washing with the 50—50 alcohol-water solution. On decanting, the resulting oil showed oiliness characteristics like the mineral oils blended with fatty oils or fatty acids. For example, on a bearing test where the original oil broke down at 1200 pounds per square inch, this prepared oil broke down at 24,000 pounds per square inch. I have obtained similar results from a wide range of fractions of different average molecular weights.

Changes may be made in the process of partial oxidation; all of the oily products or a fraction thereof may be purified; certain steps may be omitted; the temperature may be varied, and other changes may be made within the scope of my invention as defined in my claims.

I claim:

1. In the treatment of oily liquid partial oxidation products containing oxygen derivatives of aliphatic hydrocarbons to produce a lubricant, the steps consisting of fractioning said oily liquid products into fractions of different average molecular weight containing similar bodies in the range from alcohols to oxygenated acids, reacting a heavier fraction with a relatively small percentage of sulphuric acid at a temperature materially above 45° C., removing excess free sulphuric acid, and then removing oil-soluble sulphonates, leaving a lubricant substantially free from gum-forming compounds and oil-soluble sulphonates but containing oxygenated acids.

2. In the treatment of oily liquid partial oxidation products containing oxygen derivatives of aliphatic hydrocarbons to produce a lubricant, the steps consisting of fractioning said oily liquid products into fractions of different average molecular weight containing similar bodies in the range from alcohols to oxygenated acids, reacting a heavier fraction with sulphuric acid of an amount which is small relative to the amount of oily liquid products and at a temperature above 45° C., removing excess free sulphuric acid by treating with sodium sulphate solution, and then removing oil-soluble sulphonates, leaving a lubricant substantially free from gum-forming compounds and oil-soluble sulphonates but containing oxygenated acids.

3. A liquid lubricant containing a heavier fraction of an oily liquid partial oxidation product of aliphatic hydrocarbons in the range from alcohols to acids, said fraction having gum-forming compounds removed by sulphuric acid treatment and being substantially free from sulphonates.

4. A liquid aliphatic hydrocarbon containing a fraction of a liquid partial oxidation product of liquid aliphatic hydrocarbons in the range from alcohols to acids, said fraction being free from gum-forming compounds and sulphonates.

5. In the treatment of oily liquid partial oxidation products derived from mineral oil and containing oxygen derivatives of aliphatic hydrocarbons to produce a lubricant, the steps consisting of fractioning said oily liquid products into fractions of different average molecular weight containing similar bodies in the range from alcohols to oxygenated acids, reacting a heavier fraction with a relatively small percentage of sulphuric acid at a temperature materially above 45° C., removing excess free sulphuric acid, and then removing oil-soluble sulphonates leaving a lubricant substantially free from gum-forming compounds and oil-soluble sulphonates but containing oxygenated acids.

6. In the treatment of oily liquid oxidation products derived from mineral oil and containing oxygen derivatives of aliphatic hydrocarbons to produce a lubricant, the steps consisting of fractioning said oily liquid products into fractions of different average molecular weight containing similar bodies in the range from alcohols to oxygenated acids, reacting a heavier fraction with sulphuric acid of an amount which is small relative to the amount of the oily liquid products and materially above 45° C., removing excess free sulphuric acid by treating with sodium sulphate solution, and then removing oil-soluble sulphonates leaving a lubricant substantially free from gum-forming and oil-soluble sulphonates but containing oxygenated acids.

7. A liquid lubricant containing a fraction of an oily liquid partial oxidation product of liquid aliphatic hydrocarbons in the range from alcohols to acids, said fraction having gum-forming compounds removed and being substantially free from sulphonates.

JOSEPH HIDY JAMES.